(12) United States Patent
Mine et al.

(10) Patent No.: US 8,413,197 B2
(45) Date of Patent: Apr. 2, 2013

(54) VIDEO DELIVERY DEVICE, VIDEO RECEIVER AND KEY FRAME DELIVERY METHOD

(75) Inventors: Hiroshi Mine, Yokohama (JP); Shinji Kimura, Sagamihara (JP); Kaoru Konishi, Kawasaki (JP); Tomokazu Ikki, Yokohama (JP); Naohisa Seko, Kawasaki (JP)

(73) Assignee: Hitachi, Ltd., Tokyo (JP)

( * ) Notice: Subject to any disclaimer, the term of this patent is extended or adjusted under 35 U.S.C. 154(b) by 832 days.

(21) Appl. No.: 12/099,425

(22) Filed: Apr. 8, 2008

(65) Prior Publication Data

US 2008/0263605 A1    Oct. 23, 2008

(30) Foreign Application Priority Data

Apr. 9, 2007  (JP) ................................. 2007-101865

(51) Int. Cl.
*H04N 7/173*    (2011.01)

(52) U.S. Cl. ............................. 725/88; 725/93; 709/219

(58) Field of Classification Search ............ 725/86–104; 709/217–231
See application file for complete search history.

(56) References Cited

U.S. PATENT DOCUMENTS

| 6,526,475 | B1 * | 2/2003 | Everett et al. ................. 711/111 |
| 6,937,770 | B1 * | 8/2005 | Oguz et al. .................... 382/235 |
| 7,023,924 | B1 * | 4/2006 | Keller et al. ............. 375/240.26 |
| 7,430,360 | B2 * | 9/2008 | Abecassis ..................... 386/343 |
| 7,539,213 | B2 * | 5/2009 | Guillemot et al. ............ 370/473 |
| 7,577,980 | B2 * | 8/2009 | Kienzle et al. ................ 725/115 |
| 7,613,381 | B2 * | 11/2009 | Kusunoki et al. ............... 386/68 |
| 7,711,242 | B2 * | 5/2010 | Im ................................. 386/220 |
| 7,764,863 | B1 * | 7/2010 | Strasman et al. ............. 386/343 |
| 7,913,282 | B2 * | 3/2011 | Ishikawa et al. ................ 725/87 |
| 2003/0231867 | A1 | 12/2003 | Gates et al. |

FOREIGN PATENT DOCUMENTS

| JP | 8-32934 | | 2/1996 |
| JP | 9-163308 | A | 6/1997 |
| JP | 10-032809 | | 2/1998 |
| JP | 10-257415 | A | 9/1998 |
| JP | 2003-259292 | A | 9/2003 |
| JP | 2004-194215 | A | 7/2004 |

* cited by examiner

*Primary Examiner* — Annan Shang
(74) *Attorney, Agent, or Firm* — Mattingly & Malur, PC

(57) ABSTRACT

In this video delivery device including: a storage device storing key frame information including a key frame number included in a contents file and offset from the beginning of a file; and a delivery control unit, which executes delivery in a predetermined cycle, the delivery control unit refers to the key frame information cycle by cycle in executing the trick play, and transmits the key frame having the offset closest to the delivery time among the key frames included in the contents file.

7 Claims, 7 Drawing Sheets

FIG. 3

| KEY FRAME INFORMATION | | | | |
|---|---|---|---|---|
| 11 | 12 | 13 | 14 | ~105 |
| NUMBER | OFFSET | SIZE | DELIVERY TIME | |
| ⋮ | | | | |
| $I_j$ | $P_j$ | $L_j$ | $i_j$ | |
| ⋮ | | | | |

FIG. 4

| DELIVERY REQUEST | ~401 |
|---|---|
| URI | |
| START TIME ($T_0$) | |
| REPRODUCING SPEED (N) | |

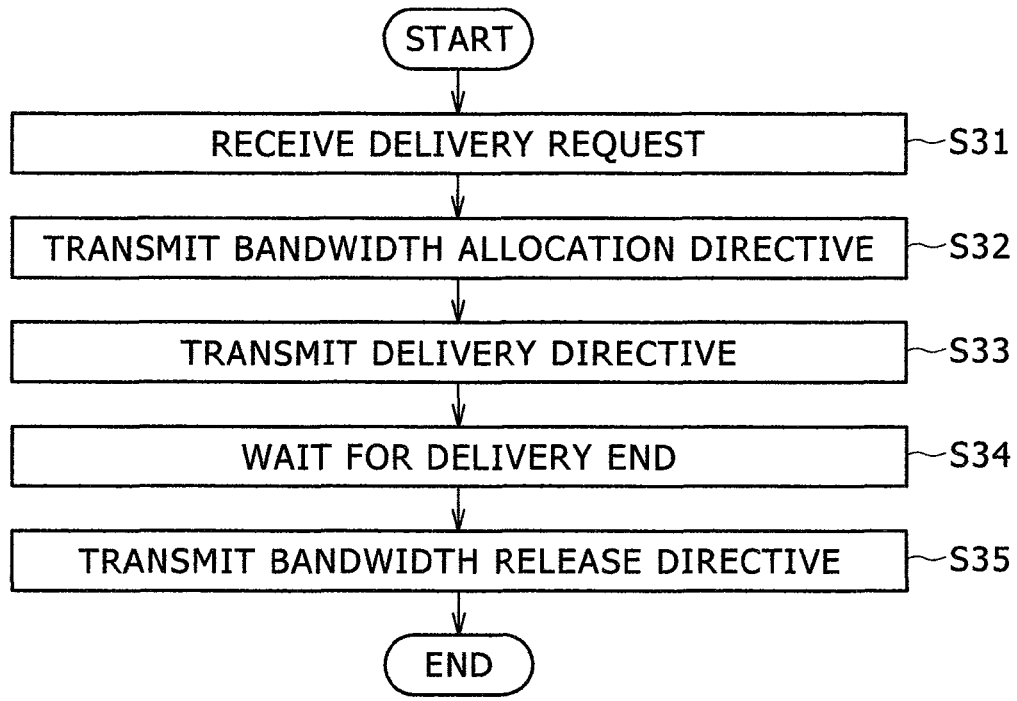
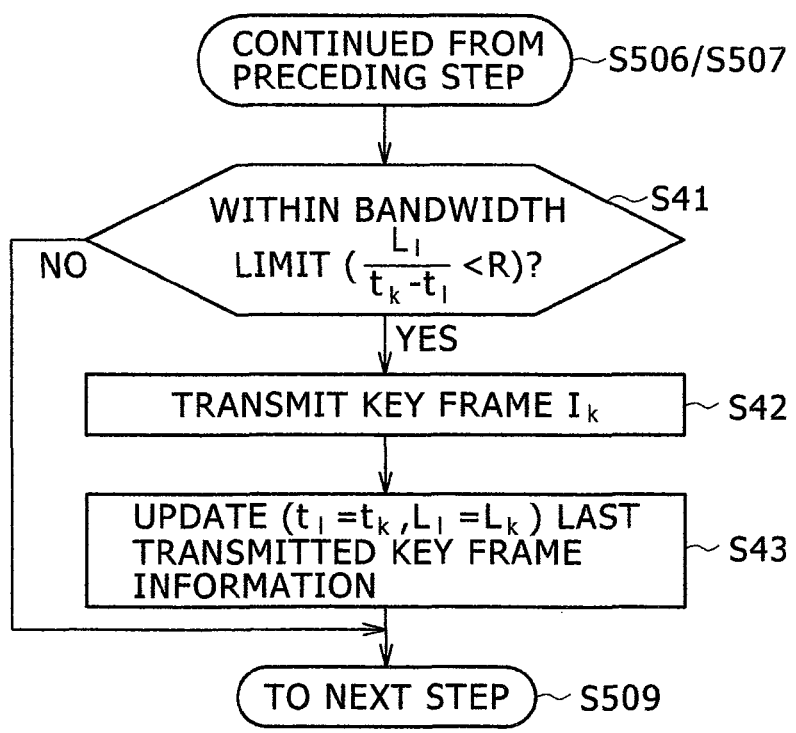

VIDEO DELIVERY DEVICE, VIDEO RECEIVER AND KEY FRAME DELIVERY METHOD

CLAIM OF PRIORITY

The present application claims priority from Japanese patent application serial no. 2007-101865, filed on Apr. 9, 2007, the content of which is hereby incorporated by reference into this application.

BACKGROUND OF THE INVENTION

This invention relates to network video delivery technology and particularly to the video delivery device, the video receiver and the key frame delivery method for achieving the trick play such as fast-forward.

In recent years, with the progress in network technology represented by the Internet, Video on demand (VOD) delivery on the network of video contents such as motion pictures has spread. In the VOD delivery, in addition to the conventional streaming delivery from a video delivery server to a personal computer (PC), VOD delivery system taking set top box (STB) connected to a television set, or a television set containing a function of STB as a client has been starting.

In these VOD delivery systems, there has been a strong demand even in the case of streaming delivery on the network toward the trick plays such as fast-forward and rewinding, which have been widely achieved in the conventional video devices. In order to meet this demand, it is necessary to generate a video stream taking the trick play into consideration in the video delivery server and deliver the same to the client such as STB.

In order to achieve the trick play, a video server device described in Japanese Patent Application Laid-Open Publication No. H10-032809, discloses the technology of generating a video stream including only a frame in which intra-frame encoding is performed (a key frame) from the compression-encoded video data and transmitting the same at an optional double speed.

In the conventional method, it is supposed that key frames are included at fixed intervals in the video contents in order to achieve reproduction at an optional double speed, the interval for reading the key frame from the video contents and delivering the same is calculated as a fixed value, and the key frames are delivered according to the internals.

The intervals of key frames included in the video contents are, however, not always fixed, and especially in the video contents of the variable bit rate (VBR), the insertion intervals of key frames often vary largely with the intensity of motion of an animation to improve the compression efficiency. Even in the case of video contents of the constant bit rate (CBR), there are some video contents where in some algorithm of encoding, the insertion interval of key frames varies, so that the key frames are often lost due to an error or the like in editing and transmitting the encoded video contents, and the key frames do not appear at fixed intervals.

In the case of applying the method disclosed in Japanese Patent Application Laid-Open Publication No. H10-032809 to the video contents where the key frames are not included at fixed intervals, in a part with thin intervals of key frames, the reproduction time of the video contents is accelerated, and in a part with dense intervals of key frames, the reproduction time of the video contents is decelerated, resulting in the possibility of causing a lag between the delivery time of key frames to be transmitted and the reproduction time. On the other hand, in the case of applying the method to the video contents lacking key frames, when the trick play is continued for a long time, a lag between the delivery time of the key frame and the reproduction time is accumulated, resulting in the possibility that the non-coincidence between the delivery time and the reproduction time of contents in the trick play becomes remarkable.

SUMMARY OF THE INVENTION

The present invention provides a video delivery device, a video receiver and a key frame delivery method, which may keep the transmission frame rate of key frames constant, and also hold down the non-coincidence between the delivery time of the key frame and the actual reproduction time of video contents to the minimum, even in the case of trick play, which transmits only the key frame, for the video contents where the key frames are not included at fixed intervals.

In order to address the above problem, the invention transmits the key frame having the delivery time closest to the cyclic delivery time using key frame information in a delivery control unit of a cyclic execution video delivery server.

The delivery control unit of the video delivery server executes in a fixed cycle. The key frame information stores the information on the offset, key frame size and the delivery time in a contents file concerning the respective key frames included in the video contents. The delivery control unit selects the key frame closest to the delivery time taking the reproducing speed into consideration at the time of cyclic execution with reference to the key frame information at every cyclic execution, and delivers the same. At this time, the same frame is often delivered multiple times at some interval of key frames included in the video contents.

The execution cycle of the delivery control unit and the reproducing speed are included in setting of the delivery server or a request from the client. A positive number is designated for the execution cycle. The execution cycle defines the transmission frame rate independently of the interval of key frames included in the video contents and the reproducing speed. When a value larger than 1 is specified for the reproducing speed, fast-forward is set, when a decimal smaller than 1 is specified, slow reproduction is set, and when a negative number is specified, rewinding (reverse reproduction) is set.

The client may ignore the time information included in the video stream, decode the key frame in each receiving for one sheet and display the same in the case of trick play.

BRIEF DESCRIPTION OF THE DRAWINGS

Preferred embodiments of the present invention will now be described in conjunction with the accompanying drawings, in which:

FIG. 3 is a diagram for explaining key frame information;
FIG. 4 is a diagram for explaining a delivery request.

FIG. 11 is a processing flowchart of a communication control part;

FIG. 12 is a flowchart for explaining part of the procedure of key frame transmission, taking a bandwidth into consideration.

DESCRIPTION OF THE PREFERRED EMBODIMENTS

The mode for carrying out the invention will now be described by the embodiments with reference to the drawings. The substantially same parts are designated by the same reference numbers to eliminate repletion of description.

Embodiment 1

Figure 1:
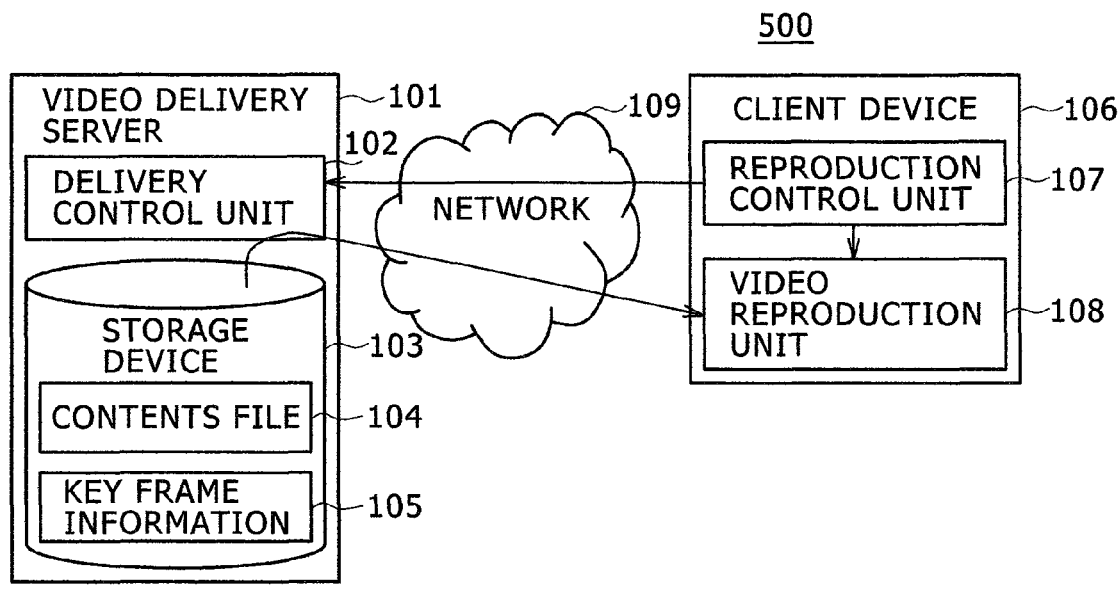
FIG. 1 is a block diagram of a video delivery system.

A video delivery system of an embodiment 1 will be described with reference to FIG. 1. In this case, FIG. 1 is a block diagram of the video delivery system. The video delivery system 500 includes a video delivery server 101 connected to a network 109 and a client device 106. The video delivery server 101 includes a communication control part 102 and a storage device 103. The delivery control unit 102 controls the operation of the video delivery server 101. The storage device 103 is an integrated hard disk drive (HDD), a storage device connected to storage area network (SAN) or the like, storing a contents file 104 and key frame information 105, which are coded data of video contents.

The client device 106 is PC, STB or the like, which includes a reproduction control unit 107 and a video reproduction unit 108. The video delivery server 101 and the client device 106 are connected to each other through a network 109 such as the Internet or local area network (LAN). The multiple client devices 106 may be connected to one video delivery server 101 through the network 109.

The reproduction control unit 107 of the client device 106 transmits a delivery request to the video delivery server 101 according to the operation of a user. The delivery control unit 102 of the video delivery server 101 reads the contents file 104 in the storage device 103 according to the received delivery request, and delivers the same to the client device 106. The video reproduction unit 108 of the client device 106 decodes the coded data of the received video contents, and displays the same as a continuous image on a display device such as a monitor or a television set.

Figure 2:
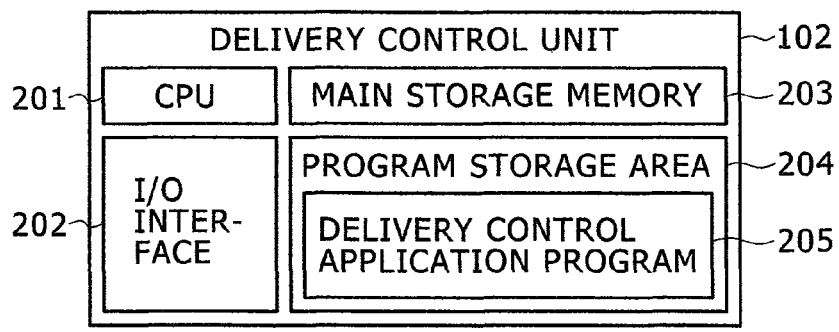
FIG. 2 is a hardware block diagram of a delivery control unit.

The internal configuration of the delivery control unit of the video delivery server will be described with reference to FIG. 2. In this case, FIG. 2 is a hardware block diagram of the delivery control unit. In FIG. 2, the delivery control unit 102 includes a central processing unit (CPU) 201, an input/output (I/O) interface 202, a main storage memory 203, and a program storage area 204. The program storage area 204 is a nonvolatile storage device such as a read only memory (ROM), which stores a delivery control application program 205. The program storage area 204 may be an area reserved in the storage device 103.

The delivery control unit 102 reads the delivery control application program 205 from the program storage area 204 in the main storage memory 203, and executes the program by the CPU 201 to control the operation of the video delivery server 101. In other words, the function of the video delivery server 101 is achieved by the delivery control application program 205. The delivery control unit 102 gains access to a device such as the storage device 103 and the network 109 through the I/O interface 202.

The reproduction control unit 107 and the video reproduction unit 108 of the client device 106 also have the same configuration as the delivery control unit 102, although being different in software stored in the program storage device 204.

The key frame information stored in the storage device of the video delivery server will be described with reference to FIG. 3. In this case, FIG. 3 is a diagram for explaining the key frame information. In FIG. 3, the key frame information 105 stores the respective information pieces on a key frame number 11, an offset 12, a size 13 and a delivery time 14 concerning all key frames included in a corresponding contents file 104. The key frame number 11 is a serial number from the beginning of the file of the frames included in the contents file 104. The key frame Ij designates the j-th key frame. The offset Pj is an offset byte indicating the position in the contents file 104 of the key frame Ij. The size Lj is a byte size indicating the size of the key frame Ij. The delivery time ij is information indicating the delivery timing in the case of delivering the key frame Ij normally (at constant velocity). The delivery time ij is the time information shown in millisecond unit taking the beginning of the contents file 104 as 0. These information pieces are previously generated using an application tool for analyzing the contents of the contents file 104. The delivery time ij may be shown in a finer unit or in a rougher unit.

The delivery request transmitted through the video delivery server network by the client device will be described with reference to FIG. 4. In this case, FIG. 4 is a diagram for explaining the delivery request. In FIG. 4, the delivery request 401 stores a uniform resource identifier (URI) for identifying the contents file 104 as a delivery object, a start time T0 indicating the delivery start position in the contents file 104 in a time unit, and a reproducing speed N. In this case, when the reproducing speed N is all except 1, a request for trick play occurs.

The delivery request 401 is generated by the reproduction control unit 107 of the client device 106 according to the operation of a user, and interpreted by the delivery control unit 102 of the video delivery server 101.

Figure 5:
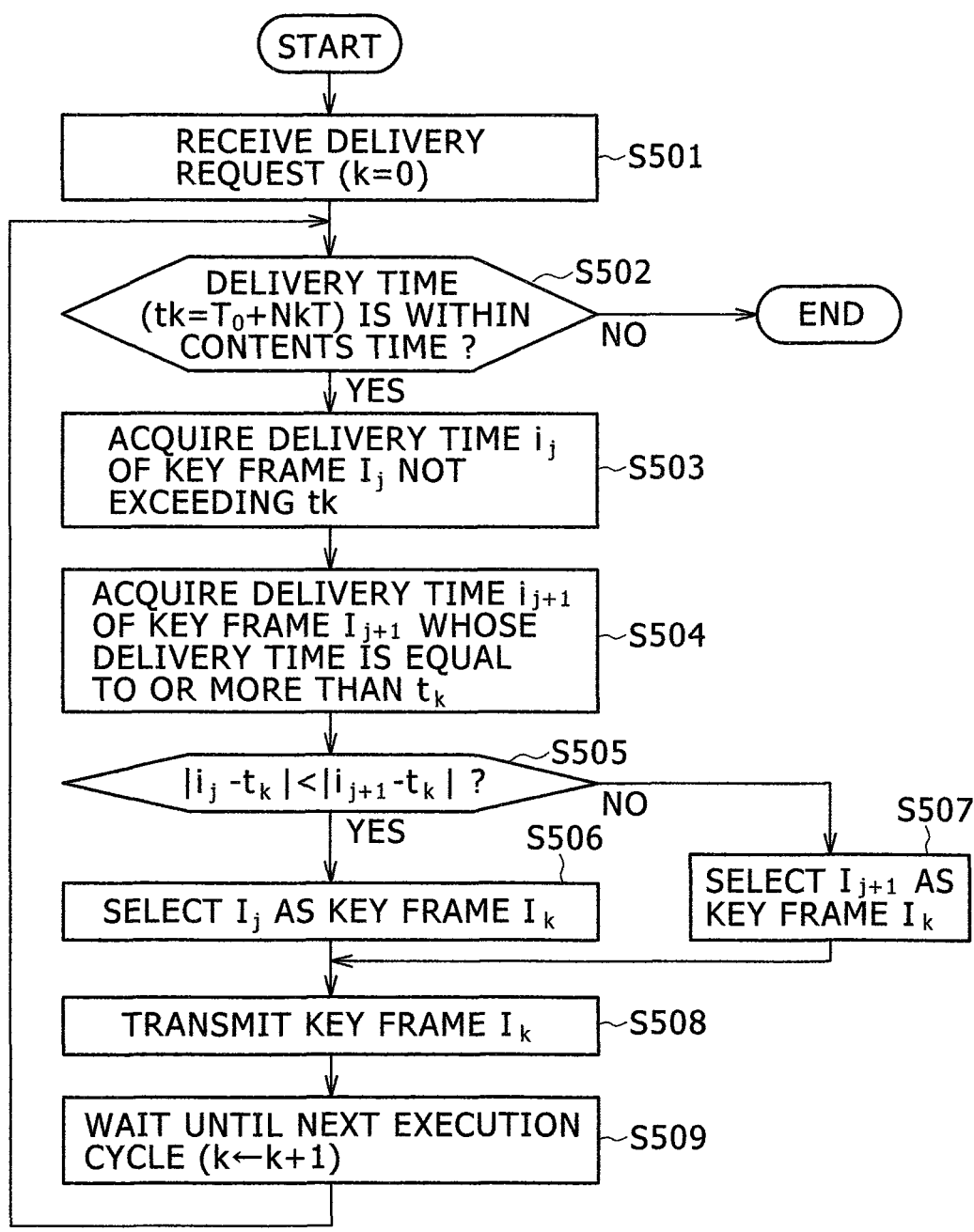
FIG. 5 is a delivery processing flowchart of a delivery processing part.

The processing flow of the delivery control unit of the video delivery server will be described with reference to FIG. 5. In this case, FIG. 5 is a delivery processing flowchart of the delivery processing part. In FIG. 5, first the delivery control unit 102 receives the delivery request 401, acquires the respective information pieces on the URI, the start time T0, and the reproducing speed N from the delivery request 401, and makes preparation for delivery such as opening of the contents file 104 designated by the URI (S501). When the reproducing speed N is 1, normal delivery is performed, so the description is omitted. The case of trick play in which the reproducing speed N is all except 1 will now be described. In the delivery control unit 102, when a counting variable of the cyclic execution count is k, at the start of delivery, k=0.

Subsequently, the delivery control unit 102 determines whether or not the delivery time falls within the reproduction time range of the contents file 104 (S502). In this case, when the interval of the cyclic execution by the delivery control unit 102, that is, the execution cycle is T, the delivery time tk at the k-th cyclic execution is represented as $tk=T0+N \times k \times T$. When the delivery time tk does not fall within the reproduction time range, the delivery control unit 102 presumes the delivery to be terminated, and terminates the processing. When the delivery time tk falls within the reproduction time range, the delivery control unit 102 advances to the step 503.

The delivery control unit 102 acquires the delivery time ij of the key frame Ij whose delivery time does not exceed tk with reference to the key frame information 105 corresponding to the contents file 104 (S503). At this time, although the key frame information 105 may be retrieved in order from the beginning first in each time, the second and subsequent retrieval may be performed from the origin of the previous delivered key frame Ik−1 to improve the retrieval efficiency.

Subsequently, the delivery control unit 102 acquires the delivery time ij+1 of the key frame Ij+1 whose delivery time is equal to or more than tk similarly with reference to the key frame information 105 (S504).

The delivery control unit 102 determines whether or not the key frame Ij is closer to the delivery time tk than the key frame Ij+1 (S505). This determination is performed by comparing the difference between the delivery time ij of the key frame Ij and tk with the difference between the delivery time ij+1 of the key frame Ij+1 and tk. That is, the delivery control unit 102 determines whether or not the inequality |ij−tk|<|ij+1−tk| holds. The delivery control unit 102 proceeds with the processing to the step 506 when the inequality holds, and when the inequality does not hold, it advances to the step 507.

In the step S506, the delivery control unit 102 selects the key frame Ij as the key frame Ik closest to the delivery time tk, and advances to the step 508. In the step 507, the delivery control unit 102 selects the key frame Ij+1 as the key frame Ik closest to the delivery time tk and advances to the step 508.

The delivery control unit 102 acquires offset Pk and size Lk concerning the selected key frame Ik with reference to the key frame information 105, reads a part corresponding to the key frame Ik from the contents file 104, and transmits the same to the client device 106 (S508). The delivery control unit 102 waits until the next execution cycle comes. When the next execution cycle comes, the counting variable k of the cyclic execution count is incremented by one (S509), and returns to the step 502.

By repeating the processing from the step 502 to the step 509, the delivery control unit 102 reads the key frame Ik having the delivery time ik closest to the delivery time tk from the contents file 104 with reference to the key frame information 105 at every cyclic execution, and transmits the same to the client device 106.

Figure 6:
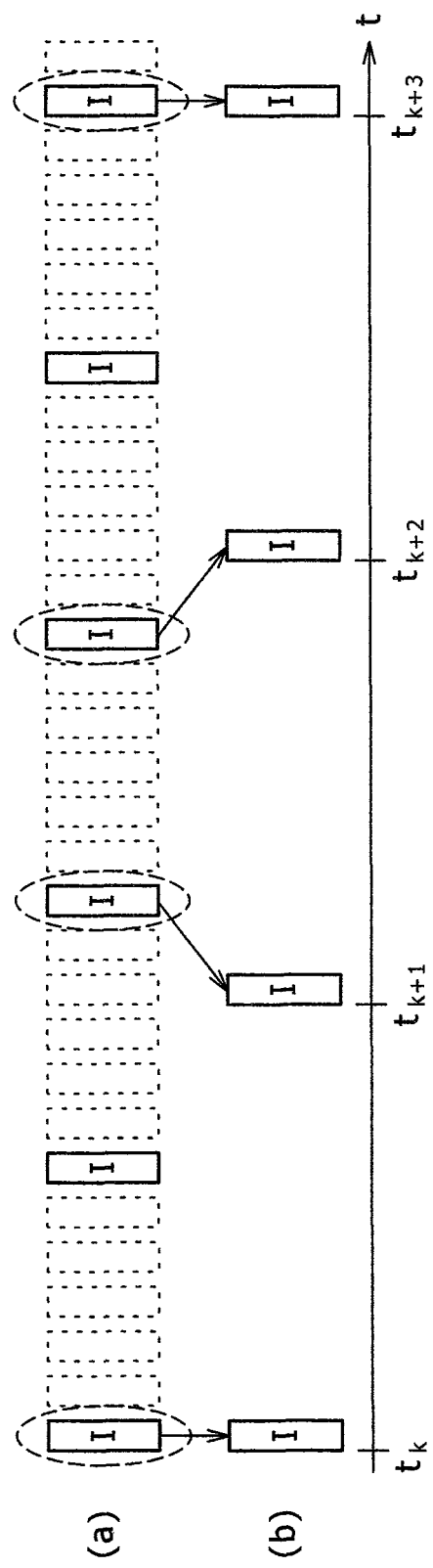
FIG. 6 is a diagram for explaining the key frame transmission of a contents file.

The key frame transmission of the contents file according to the passage of time from the video delivery server to the client device by the processing of the delivery control unit will be described with reference to FIG. 6. In this case, FIG. 6 is a diagram for explaining the key frame transmission of the contents file. In FIG. 6, FIG. 6(a) is a diagram for explaining the key frame included in the contents file. FIG. 6(b) is a diagram for explaining the intervals of transmitting the key frames in the trick play. In FIG. 6, the interval of transmitting the key frames in the trick play is independent of the interval of the key frames included in the contents file 104, and it is the execution cycle T of the delivery control unit 102. Therefore, the frame rate of the key frame transmitted from the video delivery server 101 to the client device 106 is 1/T and constant.

Figure 7:
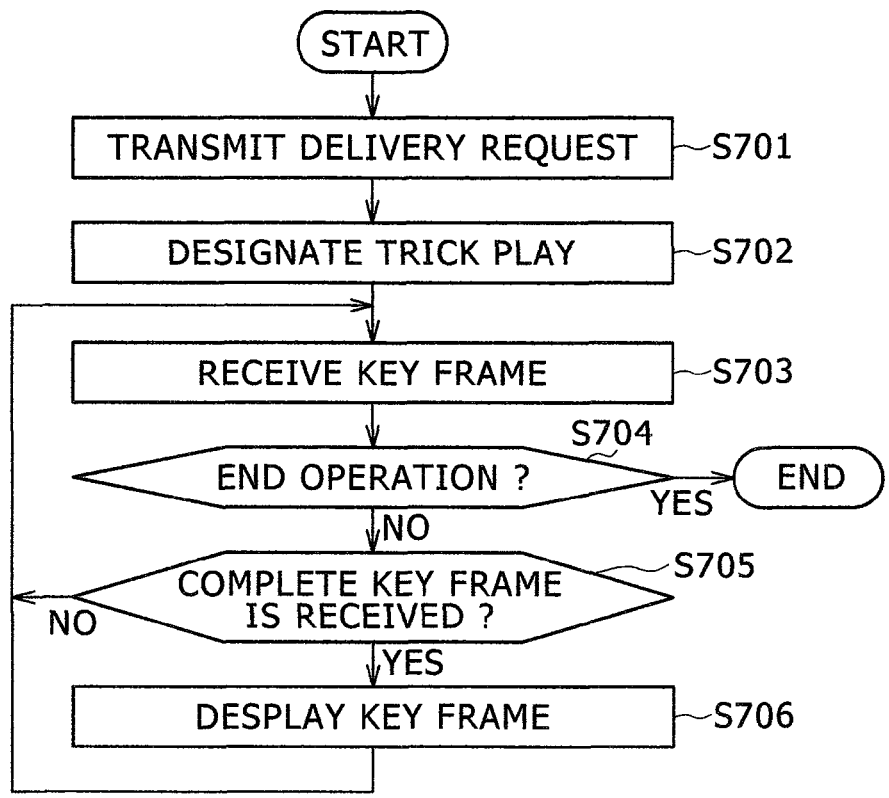
FIG. 7 is an operation flowchart of a client device.

The procedure of trick play of the client device will be described with reference to FIG. 7. In this case, FIG. 7 is an operation flowchart of the client device. In FIG. 7, first, the reproduction control unit 107 of the client device 106 transmits the delivery request 401 to the video delivery server 101 according to the operation from a user (S701).

Subsequently, the reproduction control unit 107 designates trick play for the video reproduction unit 108. According to the designation, the video reproduction unit 108 switches the reproducing operation from normal operation to the trick play operation (S702). The video reproduction unit 108 receives the key frame transmitted by the video delivery server 101 for one sheet (S703). At this time, when the user performs the termination operation, the receiving processing is terminated according to the designation from the reproduction control unit 107. Time-out is set, whereby even when the key frame is not completely received, the receiving processing may be terminated. As the time-out value, a value, which is larger than the time required for receiving one key frame and smaller than the time elapsed until the next key frame is transmitted, may be specified, and for example, it may be set to the same value as the execution cycle T of the delivery control unit 102 of the video delivery server 101.

The reproduction control unit 107 determines whether or not the receiving processing of the video reproduction unit 108 is terminated by the termination operation from the user (S704). When it is done by the termination operation, the reproduction control unit 107 terminates the video reproduction processing, and when it is not done by the termination operation, it advances to the step 705.

The video reproduction unit 108 determines whether or not a complete key frame is received (S705). When the complete key frame is not received, the video reproduction unit 108 discards the received incomplete key frame, and returns to the step 703 for receiving the next key frame. When the complete key frame is received, the video reproduction unit 108 advances to the step 706.

The video reproduction unit 108 decodes the received key frame and displays it as one static image on a display device (S706). At this time, the video reproduction unit 108 may ignore even if time information or voice information is included in part of data of the key frame. The video reproduction unit 108 returns the processing to the step 703 while the image is still displayed.

By repeating the processing from the step 703 to the step 706, the video reproduction unit 108 decodes and displays every time it receives the key frame transmitted from the video delivery server 101 to be displayed as a continuous image of an update cycle T.

According to the present embodiment, as described above, in the delivery control unit 102 of cyclic execution video delivery server 101, the key frame Ik having the delivery time ik closest to the cycle delivery time tk is transmitted using the key frame information 105. Therefore, even in the case of taking the contents file 104 in which the key frames are not included at fixed intervals as an object, the transmission frame rate of key frames can be kept constant. Further, even when the interval of key frames included in the contents file 104 varies largely, the delivery control unit 102 transmits the same key frame repeatedly in the part having the thin interval of key frames, and transmits the key frames while skipping in the part having the close interval of key frames in the execution cycle T. Thus, even when the trick play is continued for a long time, the non-coincidence between the delivery time of key frame to be transmitted and the reproduction time of the video contents can be held down to the minimum.

Embodiment 2

Figure 8:
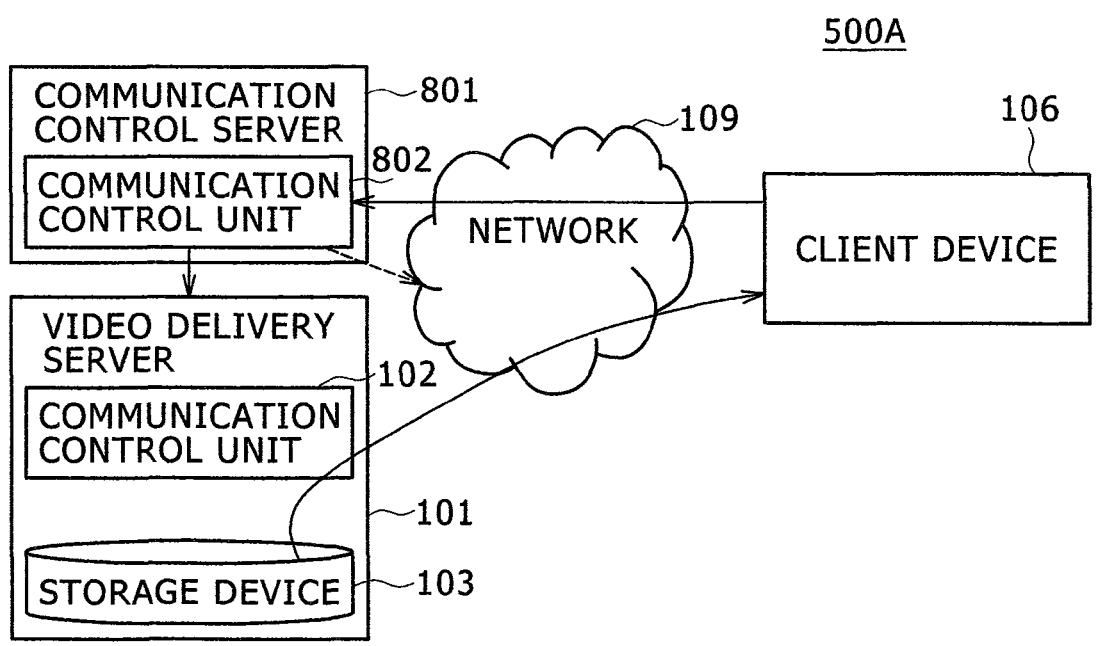
FIG. 8 is a diagram showing a video delivery system for controlling a delivery bandwidth.

The embodiment 2 will now be described with reference to FIG. 8. In this case, FIG. 8 is a block diagram of a video delivery system. In FIG. 8, the video delivery system 500A includes a communication control server 801 connected to a network 109, a video delivery server 101, and a client device 106. The communication control server 801 includes a communication control part 802. The communication control part 802 is achieved by the same configuration as that of the delivery control unit 102 of the video delivery server 101 shown in FIG. 2. The communication control part 802 accepts a delivery request 401 from the client device 106, and transmits delivery designation to the video delivery server 101 according to the delivery request 401. The communication control part 802 controls the communication bandwidth of the network 109 by transmitting bandwidth allocation designation (broken line arrow) to a communication control device such as a router and a switch constituting the network 109 or SIP (Session Initiation Protocol) server managing the communication bandwidth of the network 109. Although the communication server 801 and the video delivery server 101 are shown as different devices in FIG. 8, they may be achieved as multiple or single application program executed by a time sharing system or the like in the same device including the SIP server or the like, managing the communication bandwidth of the network 109.

Figure 9:
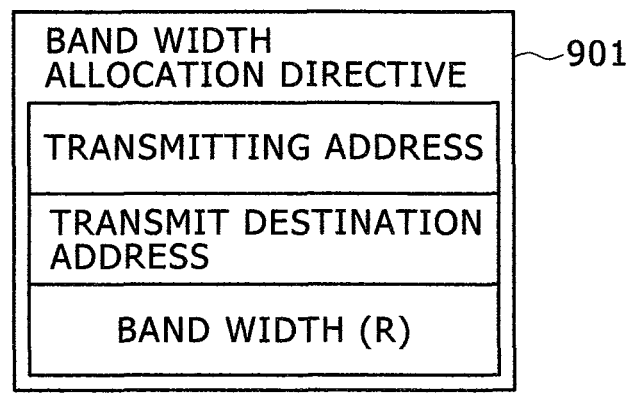
FIG. 9 is a diagram for explaining designation of bandwidth allocation.
Figure 10:
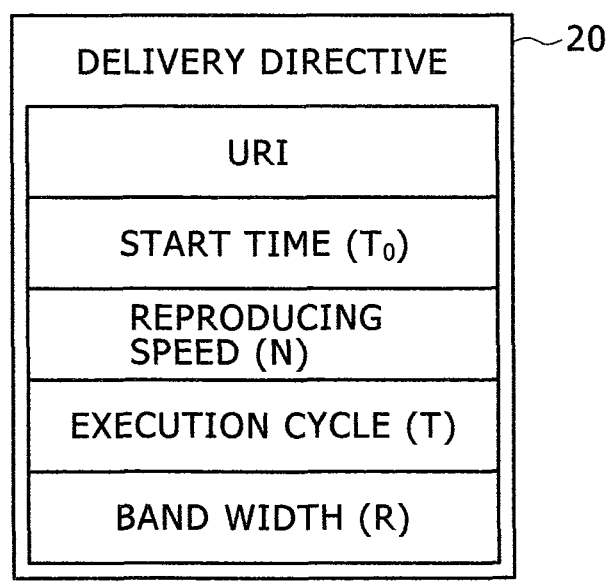
FIG. 10 is a diagram for explaining delivery designation.

The bandwidth allocation designation transmitted to the communication control device by the communication control part of the communication control server will be described with reference to FIG. 9. In this case, FIG. 9 is a diagram for explaining the bandwidth allocation designation. In FIG. 9, the bandwidth allocation designation 901 includes a transmitting address, a transmit destination address, and a bandwidth R, and designates allocation of bandwidth R as the communication bandwidth from the transmitting address to the transmit destination address in the network 109. In this case, the transmitting address is a network address of the video delivery server 101, and the transmit destination address is a network address of the client device 106. As to the bandwidth R, a suitable value may be determined based on the priority (e.g. presence/absence of accounting) of the client device 106. Delivery designation transmitted to the video delivery server by the communication control part of the communication control server will be described with reference to FIG. 10. In this case, FIG. 10 is a diagram for explaining delivery designation. In FIG. 10, the delivery designation 20 includes an execution cycle T for specifying the cycle of cyclic execution of the delivery control unit 102 of the video delivery server 101 and a bandwidth R allocated in the network 109 by the bandwidth allocation designation 901 in addition to URI, start time T0 and reproducing speed N included in the delivery request 401. When the execution cycle T is specified in this case, the communication control server 801 can control the frame rate of the key frame transmitted by the video delivery server 101. The communication control server 801 may obtain an execution cycle T not exceeding the bandwidth R and specify it in the case where the approximate byte size of the key frames stored in the video contents is known. The procedure of the communication control part of the communication control server will be described with reference to FIG. 11. In this case, FIG. 11 is a processing flowchart of the communication control part. In FIG. 11, first the communication control part 802 receives the delivery request 401 from the client device 106, and acquires the respective information pieces on URI, start time T0 and reproducing speed N (S31). Subsequently, the communication control part 802 determines a suitable bandwidth R and transmits bandwidth allocation designation 901 to the communication control device of the network 109 (S32). Subsequently, the communication control part 802 determines suitable execution cycle T and transmits delivery designation 1101 to the video delivery server 101 (S33).

The communication control part 802 waits for the video delivery server 101's to complete transmission of the key frame (S34). In this case, the communication control part 802 may recognize the completion of transmission by explicitly receiving a transmission completion notice from the video delivery server 101, or obtain the transmission completion time from the delivery time, the start time T0 and the reproducing speed N of the video contents, and wait for that time. Lastly, the communication control part 802 transmits the bandwidth release designation to the communication control device of the network 109 in order to release the bandwidth allocated in the step 32 (S35). In this case, the bandwidth release designation may be achieved by specifying a negative value for the bandwidth R of the bandwidth allocation designation 901, for example. By the above processing, the communication control part 802 of the communication control server 801 transmits the bandwidth allocation designation 901 to the network 109 according to the delivery request 401 from the client device 106 to thereby allocate the bandwidth R, and transmits delivery designation 1001 including the allocated bandwidth R and the execution cycle T to the video delivery server 101 to thereby control the delivery frame rate and the transmission bandwidth in the trick play of the video delivery server 101.

The procedure of key frame transmission taking the bandwidth into consideration in the delivery control unit of the video delivery server will be described with reference to FIG. 12. In this case, FIG. 12 is a flowchart for explaining part of the procedure of key frame transmission taking the bandwidth into consideration. In this case, the key frame transmission taking the bandwidth R into consideration is achieved by replacing the step 508 of FIG. 5 with the processing of FIG. 12. All the procedure except the step 508 is the same as the embodiment 1, so the description is omitted.

In the step 41, concerning the key frame Ik selected in the steps at the preceding stage, that is, in the step 506 or step 507, it is determined whether or not the key frame can be transmitted without exceeding the bandwidth R specified by the communication control server 801. This determination depends on whether or not concerning the size L1 and the transmit time t1 of the preceding transmitted key frame I1 and the current delivery time tk and bandwidth R, the inequality L1<(tk−t1)<R holds. When the inequality holds, it advances to the step 42. When the inequality does not hold, it advances to the next step, that is, the step 509 without performing the transmit processing for the key frame. When the preceding transmitted key frame does not exist, that is, in the case of the first key frame, it may be supposed that the inequality holds.

In the step 42, the selected key frame Ik is transmitted by the same processing as that of the step 508. Subsequently, in the step 43, the information of the last transmitted key frame I1 is updated by the information of the key frame Ik. That is, lastly the size L1 of the key frame I1 is taken as Lk, and the time t1 of transmitting the key frame last is taken as tk.

By the above processing, the delivery control unit 102 of the video delivery server 101 controls the bandwidth of the key frame transmitted by skipping transmission of the key frame exceeding the bandwidth R specified by the communication control server 801 in transmitting the key frame.

According to the invention, as described above, in the case of performing the trick play, the bandwidth R is allocated using the bandwidth allocation designation 901 to the network 109, the bandwidth of which is controllable, from the communication control server 801, and the delivery designation 1001 including the bandwidth R is transmitted to the video delivery server 101, thereby controlling the bandwidth of the key frame transmitted to the client device 106.

According to the invention, in the delivery control unit of the cyclic execution video delivery server, the key frame having the delivery time closest to the cycle delivery time is transmitted using the key frame information, whereby in the trick play transmitting only the key frame, even for the video contents where the key frames are not included at fixed intervals, the transmission frame rate of the key frames can be kept constant, and also non-coincidence between the delivery time of the key frame and the actual reproduction time of the video contents can be held down to the minimum.

What is claimed is:

1. A key frame delivery method of selecting key frames of a video file by a video delivery server connected over a network to a client device, where the video file is stored on a storage device, the key frame delivery method comprising the steps of:
   a) storing on the storage device, for each of the respective key frames included in the video file, key frame information including a key frame number that identifies the respective key frame, offset from the beginning of the video file, a relative delivery time of the key frame from the beginning of the video file in a case of delivering the video file at normal play and a size of the key frame;
   b) determining a cycle delivery time $t_k$, where $t_k = T_0 + N \times k \times T$ and $T_0$ is the relative start time of a trick play from the beginning of the video file, k is a cycle number of the trick play and N is a reproduction speed of the trick play;
   c) acquiring a key frame relative delivery time $i_j$ of a key frame $l_j$ prior and closest to the relative delivery time $t_k$;
   d) acquiring a key frame relative delivery time $i_{j+1}$ of a key frame $l_{j+1}$ subsequent and closest to the relative delivery time $t_k$;
   e) selecting, at the video delivery server, a key frame $l_k$ having the delivery time closest to the cycle delivery time $t_k$, where $l_k$ is selected from among key frames $l_j$ and the $l_{j+1}$ by comparing $|t_k - i_j|$ with $|i_{j+1} - t_k|$;
   f) transmitting the selected key frame $l_k$ to the client device;
   g) incrementing the cycle number k; and
   h) repeating steps b) through g),
   wherein said $|t_k - i_j|$ is an absolute difference between the relative delivery time $t_k$ and the key frame relative delivery time $i_j$ of the key frame $l_j$ prior and closest to the relative delivery time $t_k$, and
   wherein said $|i_{j+i} - t_k|$ is an absolute difference between the key frame relative delivery time $i_{j+1}$ of the key frame $l_{j+1}$ subsequent and closest to the relative delivery time $t_k$.

2. The key frame delivery method according to claim 1, wherein the cycle delivery time $t_k$ is controlled to adjust the delivery rate of the key frames.

3. The key frame delivery method according to claim 1, further comprising the steps of:
   after step e):
   dividing the size of the last transmitted key frame by the difference obtained by subtracting the transmit time of the last transmitted key frame from the next delivery time;
   comparing the value obtained by division with the bandwidth; and
   skipping the key frame exceeding the bandwidth in transmission.

4. A video delivery device, which enables a client device, connected to the video delivery device over a network, to achieve trick play by delivering key frames included in a video file, comprising:
   a storage device, which stores
      the video file, which includes a plurality of key frames, and
      key frame information including, with respect to each key frame, a key frame number that identifies the respective key frame in the video file, and a relative delivery time $i_j$ which indicates a relative delivery time of the j-th key frame $l_j$ from the beginning of the video file in case of delivering the video file at normal play; and
   a delivery control unit, which delivers said key frames in a predetermined cycle T in the trick play,
   wherein said delivery control unit, at a k-th cycle in the trick play, refers to the key frame information, selects a key frame which has a relative delivery time $i_k$ that is closest to the relative delivery time $t_k$, where $t_k = T_0 + N \times k \times T$ and $T_0$ is the relative start time of the trick play from the beginning of the video file and N is a reproduction speed of the trick play, depending on the reproduction speed, and transmits the selected key frame as the k-th key frame $l_k$,
   wherein said delivery control unit selects the k-th key frame $l_k$ from key frames $l_j$ and $l_{j+1}$ by comparing $|t_k - i_j|$ with $|i_{j+1} - t_k|$,
   wherein said $|t_k - i_j|$ is an absolute difference between the relative delivery time $t_k$ and a key frame relative delivery time $i_j$ of a key frame $l_j$ prior and closest to the relative delivery time $t_k$,
   wherein said $|i_{j+i} - t_k|$ is an absolute difference between a key frame relative delivery time $i_{j+1}$ of a key frame $l_{j+1}$ subsequent and closest to the relative delivery time $t_k$, and
   wherein the key frame $l_k$ is selected as being closest in time to the relative delivery time $t_k$ depending to the reproduction speed at the k-th cycle.

5. The video delivery device according to claim 4, wherein said cycle delivery time $t_k$ is controlled to adjust the delivery rate of key frames.

6. The video delivery device according to claim 4, wherein a value obtained by dividing the size of the last transmitted frame by a difference obtained by subtracting the transmit time of the last transmitted key frame from the next delivery time is compared with the bandwidth to skip the key frame exceeding the bandwidth in transmission, thereby limiting the bandwidth of key frame transmission.

7. The communication control device, which controls the communication of the video delivery device according to claim 6,
   wherein according to a request from the video receiver, the communication bandwidth of a network is allocated, the allocated communication bandwidth and the cycle delivery time are transmitted as the delivery designation information to the video delivery device, thereby controlling the delivery bandwidth and the delivery frame rate of the video delivery device.

* * * * *